(12) United States Patent
Ralston

(10) Patent No.: US 6,349,899 B1
(45) Date of Patent: Feb. 26, 2002

(54) AIRCRAFT AUXILIARY AIR INTAKE WITH RAM AND FLUSH OPENING DOOR

(75) Inventor: Mark D. Ralston, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/542,694

(22) Filed: Apr. 4, 2000

(51) Int. Cl.$^7$ ................................................ B64D 33/02
(52) U.S. Cl. ..................................................... 244/53 B
(58) Field of Search ........................... 244/53 B, 110 B; 137/15.1, 15.2; 60/270.1

(56) References Cited

U.S. PATENT DOCUMENTS

| | | | |
|---|---|---|---|
| 4,150,802 A | * | 4/1979 | Evelyn et al. |
| 4,174,083 A | | 11/1979 | Mohn |
| 4,203,566 A | * | 5/1980 | Lord |
| 4,418,879 A | | 12/1983 | Vanderleest |
| 4,836,473 A | * | 6/1989 | Aulehla et al. ........... 244/53 B |
| 5,209,057 A | * | 5/1993 | Remlaoui |
| 5,782,434 A | * | 7/1998 | Jean |

* cited by examiner

*Primary Examiner*—Charles T. Jordan
*Assistant Examiner*—T. Dinh
(74) *Attorney, Agent, or Firm*—Harness Dickey & Pierce P.L.C.

(57) ABSTRACT

An air inlet mechanism having a housing and a door structure, and being particularly well adapted or supplying a ram airflow to an auxiliary power unit (APU) of an aircraft while minimizing the aerodynamic drag created by the mechanism. The housing includes a body portion with a fluid conduit formed therethrough. The body portion also includes a wall member that defines an end wall with at least a portion of the endwall being concave in shape such that a recessed cavity is formed in the fluid conduit. The door structure is pivotably coupled to the housing and movable between a closed position substantially closing the fluid conduit and an open position wherein the door structure is disposed within the fluid conduit. The recessed cavity receives at least a portion of the door structure when the door structure is moved between the closed position and the open position. Construction in this manner provides an air inlet mechanism having relatively high ram recovery when the door structure is placed in a ram position, relatively little aerodynamic drag when the door structure is placed in a closed position, and relatively little back pressure (i.e., blockage) of a duct structure when the door structure is placed in the open position.

16 Claims, 3 Drawing Sheets

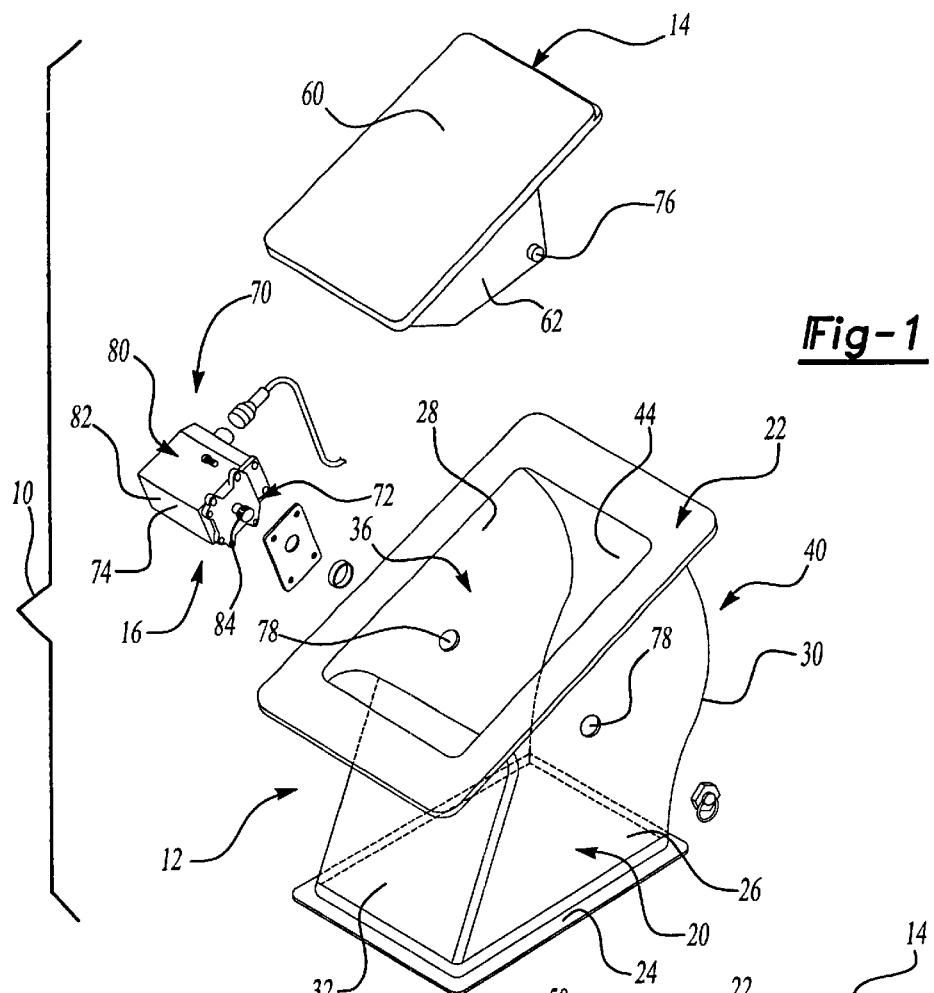
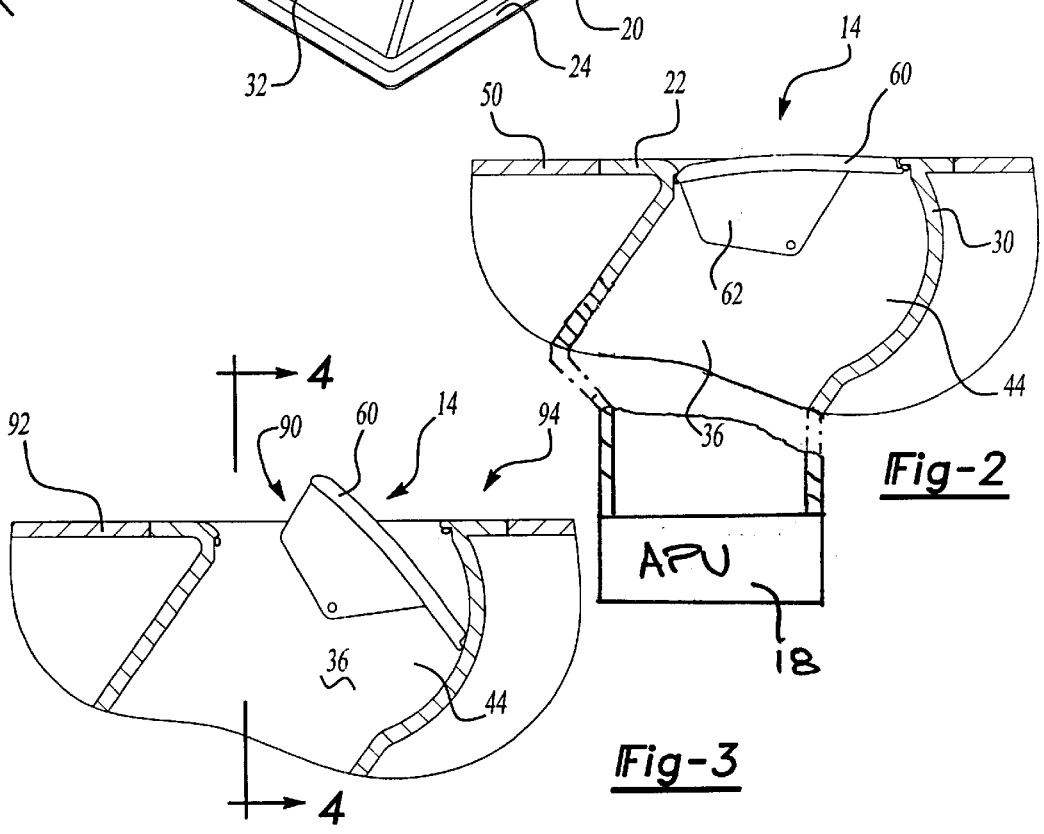
Fig-1
Fig-2
Fig-3

AIRCRAFT AUXILIARY AIR INTAKE WITH RAM AND FLUSH OPENING DOOR

TECHNICAL FIELD

The present invention relates generally to aircraft ventilation mechanisms and more particularly to an aircraft ventilation mechanism having a door that may be positioned in a flush open position.

BACKGROUND ART

In the design of auxiliary air inlet doors, several design goals must be considered. One such goal relates to the pressure drop that results from the (partial) blockage of the duct when the door is fully opened. When the aircraft is on the ground, it is frequently desirable to open the door as far as possible so as not to induce a pressure drop. This is particularly important, for example, when the air inlet door is used to selectively control the flow of air to a conventional auxiliary power unit ("APU") having a gas turbine engine. This is because the gas turbine engine of the APU will not operate properly if the pressure drop that results from the blockage of the duct sufficiently limits the amount of air that may be drawn into the engine. In extreme cases, the pressure drop may cause an insufficient amount of air to be drawn into the gas turbine engine and prevent the auxiliary power unit from operating.

Another goal relates to the amount by which the door extends into the free stream airflow. Minimizing the extent to which the door projects into the free stream airflow improves the aerodynamics of the aircraft, reduces the amount of noise that is transmitted to the cabin of the aircraft, and reduces concerns associated with the formation of ice on the door. Due to the conflicting nature of these goals, the design of auxiliary inlet doors is usually a compromise of various factors with the designer trading one performance aspect for another until the total result satisfies all of the design criteria to the extent possible.

One suggested solution is a 'bicycle seat' vane which is mounted externally on the auxiliary door. The 'bicycle seat' vane acts as a vortex generator to enhance ram recovery without requiring a wide opening scoop-shaped door. However, the vane is quite prominent and generates some aerodynamic drag even when the door is closed.

Another suggested solution is a long NACA flush scoop with a moving ramp to close the inlet opening. While this arrangement minimizes drag, the ram recovery is negatively affected because the inlet is immersed in the thick airstream boundary layer at the aft end of the fuselage. Some of these arrangements have problems with fluids that may leak from the airplane, as these fluids tend to migrate along the fuselage belly where they are ingested by the scoop. Generally, these scoops are also less compact and heavier than conventional auxiliary doors.

SUMMARY OF THE INVENTION

It is one object of the present invention to provide an air inlet mechanism having high ram recovery.

It is a further object of the present invention to provide an air inlet mechanism having relatively little aerodynamic drag when an inlet door is placed in a fully opened position.

It is yet another object of the present invention to provide an air inlet mechanism which produces a relatively small pressure drop in an duct connected to the air inlet mechanism when a door structure is placed in a fully opened position.

In one preferred form, the present invention provides an air inlet mechanism having a housing and a door structure. The housing includes a body portion with a fluid conduit formed therethrough. The body portion also includes a wall member that defines an end wall with at least a portion of the endwall being concave in shape such that a recessed cavity is formed in the fluid conduit. The door structure is pivotably coupled to the housing and movable between a closed position substantially closing the fluid conduit and an open position wherein the door structure is disposed within the fluid conduit. The recessed cavity receives at least a portion of the door structure when the door structure is moved between the closed position and the open position. Construction in this manner provides an air inlet mechanism having relatively high ram recovery when the door structure is placed in a ram position, relatively little aerodynamic drag when the door structure is placed in a closed position, and relatively little back pressure (i.e., blockage) of a duct structure when the door structure is placed in the open position.

BRIEF DESCRIPTION OF THE DRAWINGS

Additional advantages and features of the present invention will become apparent from the subsequent description and the appended claims, taken in conjunction with the accompanying drawings, wherein:

FIG. 1 is an exploded perspective view of an auxiliary air inlet door constructed in accordance with the teachings of a first embodiment of the present invention;

FIG. 2 is a partial sectional view of the auxiliary air inlet door of FIG. 1 illustrating the inlet door in a closed position;

FIG. 3 is a partial sectional view of the auxiliary air inlet door of FIG. 1 illustrating the inlet door in a ram-air position;

DETAILED DESCRIPTION OF THE PREFERRED EMBODIMENT

Figure 4:
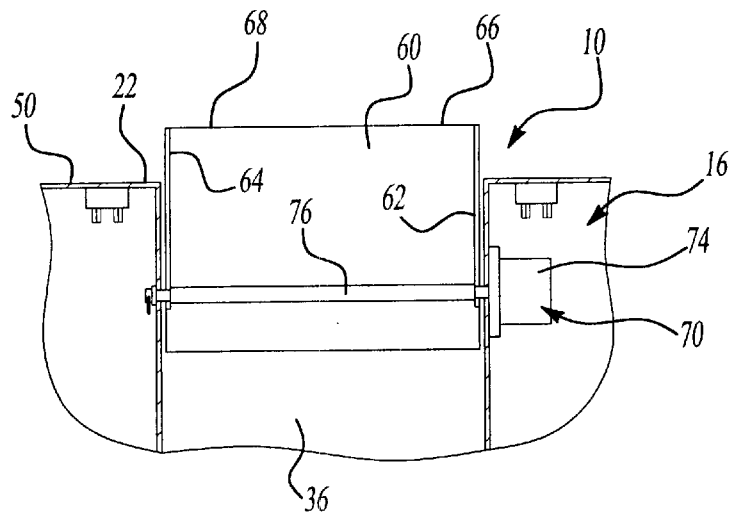
FIG. 4 is a partial sectional view of the auxiliary air inlet door taken along the line 4—4 in FIG. 3.

With reference to FIGS. 1 and 2 of the drawings, an air inlet mechanism constructed in accordance with the teachings of a first preferred embodiment of the present invention is generally indicated by reference numeral 10. Air inlet mechanism 10 is shown to include a housing 12, an inlet door 14 and a drive mechanism 16. In the example provided, air inlet mechanism 10 operates to provide a selectively controlable flow of air to a conventional auxiliary power unit (APU) 18. However, those skilled in the art will understand that the use of air inlet mechanism 10 with an APU is merely exemplary and that the teachings and applicability of the present invention will not be limited in scope to only this one such application.

Housing 12 is shown to include a body portion 20 and first and second flange portions 22 and 24, respectively. Body portion 20 is formed by a generally vertical wall member 26 that extends between first and second flange portions 22 and 24. Sidewalls 26 and 28 are generally perpendicular to endwalls 30 and 32. Wall member 26 defines a duct cavity 36 that permits fluids such as air to flow through housing 12. A portion 40 of endwall 30 proximate first flange portion 22 is concave in shape, causing the formation of a recessed cavity 44 in the interior of duct cavity 36. First flange portion 22 is adapted to be coupled to an airplane structure 50 (shown in FIG. 2) to facilitate the installation of air inlet mechanism 10. Second flange portion 24 is adapted to be coupled to ducting (not shown) that delivers air to the APU 18.

With additional reference to FIGS. 2 through 5, inlet door 14 is shown to include an end member 60 and first and second side members 62 and 64. End member 60 is sized to substantially close duct cavity 36. First and second side members 62 and 64 are coupled to opposite sides 66 and 68, respectively, of end member 60.

Drive mechanism 16 includes a stationary portion 70 and a moving portion 72. Stationary portion 70 is adapted to fix drive mechanism 16 to housing 12 and moving portion 72 is adapted to move inlet door 14 relative to housing 12. In the particular embodiment illustrated, drive mechanism 16 includes a rotary actuator 74 and a pivot pin 76. Pivot pin 76 extends through apertures 78 in sidewalls 26 and 28 and first and second side members 62 and 64 of the inlet door 14. Inlet door 14 is coupled for rotation with pivot pin 76, and pivot pin 76 is coupled for rotation with moving portion 72. Sidewalls 26 and 28 support pivot pin 76 for rotation within apertures 78. A seal (not specifically shown) may be employed to ensure that high pressure air will not escape from apertures 78. As shown, rotary actuator 74 includes an electric motor 80 having a fixed housing 82 and a rotatable output shaft 84. Housing 82 is fixedly coupled to sidewall 28 and pivot pin 76 is coupled for rotation with output shaft 84.

Figure 5:
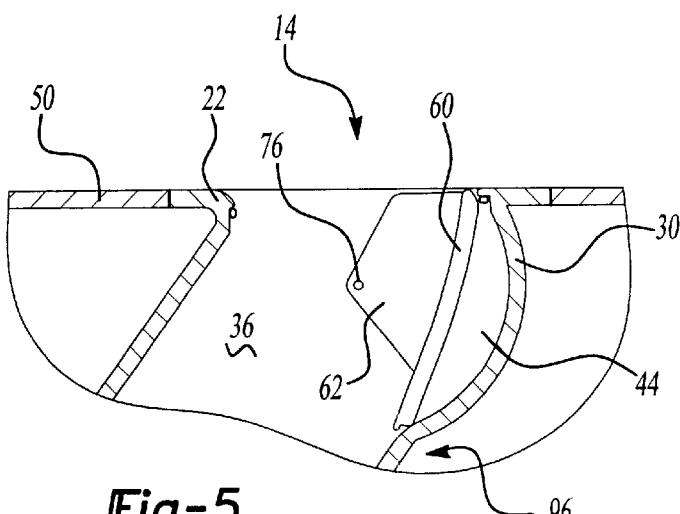
FIG. 5 is a partial sectional view of the auxiliary air inlet door of FIG. 1 illustrating the inlet door in a fully opened position.

Rotation of output shaft 84 causes inlet door 14 to move between a closed position (FIG. 2), a ram air inlet position (FIG. 3) and a fully opened position (FIG. 5). Placement of the inlet door 14 in the closed position substantially closes duct cavity 36 and inhibits the flow of air therethrough. Placement of the inlet door 14 in the ram air inlet position permits end member 60 and first and second side members 62 and 64 to cooperate and form a scoop 90 that directs air from the air stream adjacent the fuselage 92 of the aircraft 94. Placement of the inlet door 14 in the fully opened position retracts the inlet door 14 into duct cavity 36 such that end member 60 is substantially parallel with the lower portion 96 of endwall 30, thereby minimizing the obstruction of the duct cavity 36 to minimize pressure losses during ground operation of the aircraft 94. It should be noted that the concave shape of the endwall 30 is critical to the invention in that it provides additional clearance to permit the inlet door 14 to rotate in an inward and downward manner so that end member 60 is substantially parallel with the lower portion 96 of endwall 30.

Advantageously, the configuration of the air inlet mechanism of FIG. 1 is such that its failure modes (e.g., the inability of inlet door 14 to fully close) are benign in that there is no door position that would result in a level of aerodynamic drag which significantly affects aircraft 94 takeoff and climb performance. Unlike conventional auxiliary air inlet doors that would be blown open to their ram air positions, the configuration of the present invention would permit the inlet door 14 be blown to the full open position shown in FIG. 5. This failure mode would only affect the aerodynamic drag of the aircraft 94 in a negligible manner. Moreover, the risk of the inlet door 14 becoming detached from the aircraft 94 because of the force of the airflow is virtually eliminated.

With reference to FIGS. 6 through 9 of the drawings, an air inlet mechanism constructed in accordance with the teachings of a second preferred embodiment of the present invention is generally indicated by reference numeral 10'. Air inlet mechanism 10' is substantially similar to air inlet mechanism 10, except that drive mechanism 16' is substituted for drive mechanism 16.

In the particular embodiment shown, drive mechanism 16' includes a pair of linkages 100, a torque tube 102 and a rotary actuator 74'. Each pair of linkages 100 includes a first link member 104, a second link member 106, and a plurality of pivot pins 108 which pivotably couple inlet door 14' to sidewalls 28' and 30' of housing 12'. Each of the second links 106 is about twice the length of its corresponding first link 104. Torque tube 102 is positioned in an attitude that is concentric with pivot pin 108a and is fixedly coupled to each of the first link members 104. Accordingly, torque applied to first link member 104a is transmitted through first link member 104b.

Figure 6:
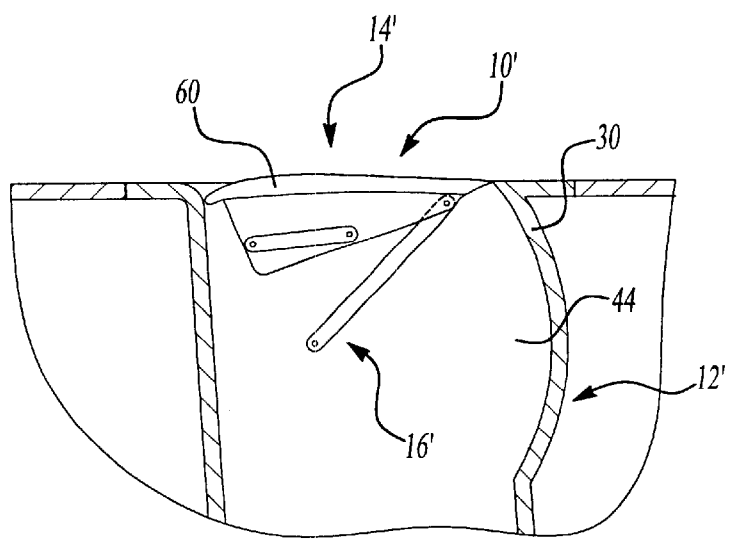
FIG. 6 is a partial sectional view of an auxiliary air inlet door constructed in accordance with a second embodiment of the present invention.
Figure 7:
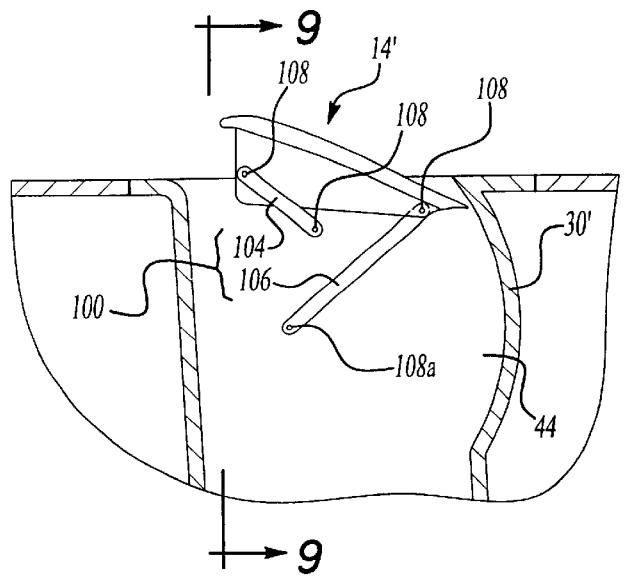
FIG. 7 is a partial sectional view of the auxiliary air inlet door of FIG. 6 illustrating the inlet door in a ram-open position.
Figure 8:
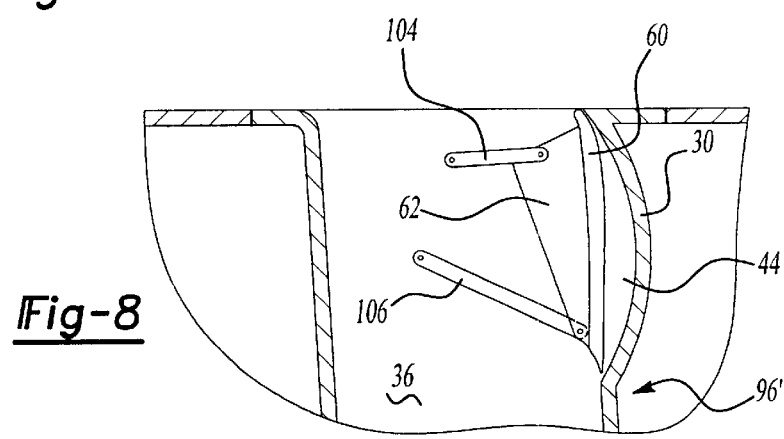
FIG. 8 is a partial sectional view of the auxiliary air inlet door of FIG. 6 illustrating the inlet door in a fully open position.
Figure 9:
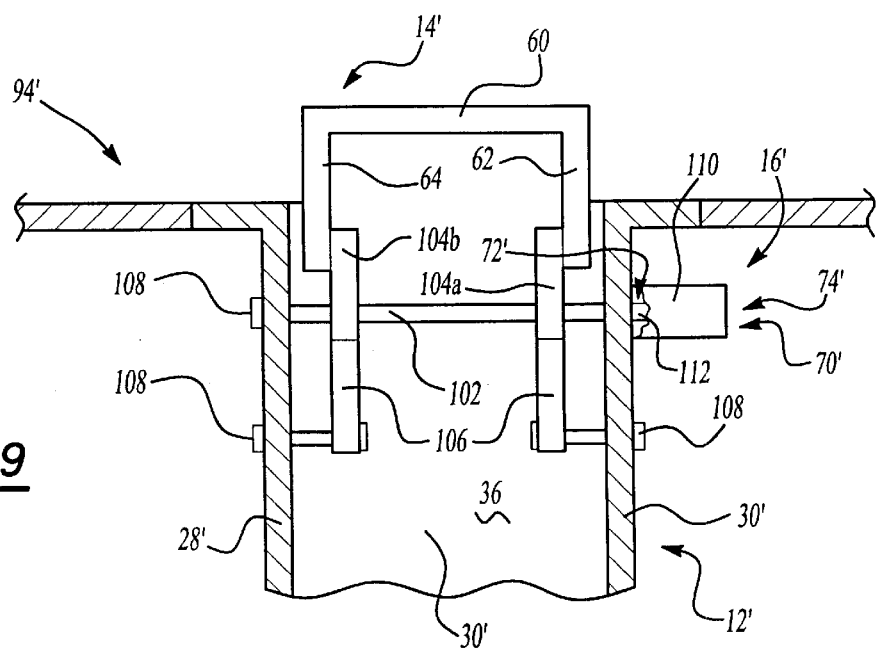
FIG. 9 is a partial sectional view of the auxiliary air inlet door taken along the line 9—9 in FIG. 7.

Like rotary actuator 74, rotary actuator 74' includes a stationary portion 70' having a housing 110 that is fixedly coupled to housing 12' and a moving portion 72' having an output shaft 112. Rotation of the output shaft 112 causes first link member 104a to rotate about pivot pin 108a, causing inlet door 14' to move from a substantially closed position as shown in FIG. 6 to a ram air position as shown in FIG. 7. Like air inlet mechanism 10, the concave shape of the endwall 30' is critical to the invention in that it provides additional clearance to permit the inlet door 14' to rotate inward and downward so that end member 60 is substantially parallel with the lower portion 96' of endwall 30'.

In operation, rotation of output shaft 112 causes first link members 104a and 104b to rotate inlet door 14' upward and outward from the aircraft 94'. As shown in FIG. 7, drive mechanism 16' permits inlet door 14' to extend further into the air stream adjacent to the aircraft 94' as compared to drive mechanism 16. As such, this configuration provides enhanced ram recovery. As with air inlet mechanism 10, the failure modes associated with air inlet mechanism 10' are benign and do not materially affect the aerodynamic drag of the aircraft 94'. As with air inlet mechanism 10, failure of the drive mechanism 16' would cause the inlet door 14' to be blown to the fully opened position. Thus, the risk of the detachment of the inlet door 14' in such a situation is significantly reduced or eliminated.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. In particular, while the present invention has been described in connection with an APU, it will be appreciated that the invention will have utility in virtually any application where it is necessary to supply a ram airflow to another component or subsystem of an aircraft or other vehicle, and where it is important to also minimize the aerodynamic drag created while providing the ram airflow. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. An air inlet mechanism for an aircraft, the air inlet mechanism comprising:

a housing having a body portion with a fluid conduit formed therethrough, the body portion having a wall member that defines an end wall, at least a portion of the endwall being concave in shape such that a recessed cavity is formed in the fluid conduit; and a door structure pivotably coupled to the housing and movable between a closed position, an open position and a ram open position between the closed position and the open position for directing air into the fluid conduit, the closed position substantially closing the fluid conduit, the door structure being disposed within the fluid conduit when placed in the open position, at least a portion of the door structure extending outwardly of the housing when the door structure is placed in the ram open position, the recessed cavity receiving at least a portion of the door structure when the door structure is moved between the closed position and the open position.

2. The air inlet mechanism of claim 1, further comprising a drive mechanism for moving the door structure between the closed position and the open position.

3. The air inlet mechanism of claim 2, wherein the drive mechanism includes a rotary actuator for rotating the door structure about a pivot axis.

4. The air inlet mechanism of claim 3, wherein the rotary actuator includes an electric motor.

5. The air inlet mechanism of claim 3, wherein the rotary actuator includes a kinematic linkage.

6. The air inlet mechanism of claim 5, wherein the kinematic linkage includes a pair of linkages coupled to the first and second sides of the door structure, each pair of linkages having a first link coupled to a forward portion of the door structure and a second link coupled to a rearward portion of the door structure, the first links receiving a rotational output to rotate the door structure relative to the housing.

7. The air inlet mechanism of claim 6, wherein, the second link is about twice the length of the first link.

8. The air inlet mechanism of claim 6, wherein a torque tube connects each of the first links together.

9. An air inlet mechanism for an aircraft, the air inlet mechanism comprising:

a housing having a duct cavity formed therethrough, the housing having an end wall and first and second sidewalls, the first and second sidewalls coupled to the first and second ends of the end wall, respectively, the end wall having a recessed cavity;

a door structure having an end member and first and second side members coupled to opposite sides of the end member; and a drive mechanism having a moving portion and a stationary portion, the stationary portion coupled to one of the housing, the moving portion coupled to the door structure and operable for moving the door structure in the duct cavity between a closed position, a ram open position and a fully opened position, the ram open position being located between the closed position and the open position and operable for directing air into the fluid conduit, the closed position substantially closing the fluid conduit, the door structure being disposed within the fluid conduit when placed in the open position, at least a portion of the door structure extending outwardly of the housing when the door structure is placed in the ram open position, wherein at least a portion of the door structure passes through the recessed cavity in the end wall when the door structure is moved between the ram open and fully open positions.

10. The air inlet mechanism of claim 9, wherein the drive mechanism includes a rotary actuator for rotating the door structure about a pivot axis.

11. The air inlet mechanism of claim 10, wherein the drive mechanism includes an electric motor.

12. The air inlet mechanism of claim 9, wherein the drive mechanism includes a kinematic linkage.

13. The air inlet mechanism of claim 12, wherein the kinematic linkage includes a pair of linkages coupled to the first and second sides of the door structure, each pair of linkages having a first link coupled to a forward portion of the door structure and a second link coupled to a rearward portion of the door structure, the first links receiving a rotational output to rotate the door structure relative to the housing.

14. The air inlet mechanism of claim 13, wherein, the second link is about twice the length of the first link.

15. The air inlet mechanism of claim 13, wherein a torque tube connects each of the first links together.

16. An air inlet mechanism comprising:

an inlet door having an endwall and first and second sidewalls;

a housing having a wall member and first and second flanges, the wall member extending between the first and second flanges and defining a duct cavity, the wall member having a concave portion proximate the first flange, the first flange adapted to be coupled to an aircraft structure, the second flange adapted to be coupled to a duct structure; and a drive mechanism coupling the inlet door to the housing, the drive mechanism including a rotary actuator and a hinge pin, the rotary actuator having an output shaft, the hinge pin coupled for rotation with the output shaft, the hinge pin extending through the wall member of the housing and the first and second sidewalls of the inlet door, the inlet door being fixed for rotation with the hinge pin, the wall member of the housing journally supporting the hinge pin;

wherein the inlet door is operable between a closed position wherein the inlet door substantially closes the duct cavity, a ram air position in which the endwall and first and second sidewalls cooperate to form a scoop, and at least a portion of the inlet door has rotated into the concave portion of the duct cavity, and an open position wherein the inlet door is substantially disposed in the duct cavity.

* * * * *